United States Patent
Seo et al.

(10) Patent No.: US 9,842,159 B2
(45) Date of Patent: Dec. 12, 2017

(54) DATA ANALYSIS APPARATUS AND METHOD

(71) Applicant: SAMSUNG SDS CO., LTD., Seoul (KR)

(72) Inventors: Bum Joon Seo, Seoul (KR); Hyung Chan Kim, Seoul (KR); Kyu Sam Oh, Seoul (KR); Soon Hwan Kwon, Seoul (KR); Min Hwan Oh, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 0 days.

(21) Appl. No.: 15/239,199

(22) Filed: Aug. 17, 2016

(65) Prior Publication Data
US 2016/0357848 A1 Dec. 8, 2016

Related U.S. Application Data

(62) Division of application No. 14/291,855, filed on May 30, 2014, now Pat. No. 9,454,595.

(30) Foreign Application Priority Data

May 31, 2013 (KR) .................. 10-2013-0062415

(51) Int. Cl.
*G06F 17/30* (2006.01)
(52) U.S. Cl.
CPC .. *G06F 17/30598* (2013.01); *G06F 17/30498* (2013.01)
(58) Field of Classification Search
None
See application file for complete search history.

(56) References Cited

U.S. PATENT DOCUMENTS

| | | | |
|---|---|---|---|
| 7,081,095 B2* | 7/2006 | Lynn | A61B 5/087 128/203.23 |
| 7,224,642 B1* | 5/2007 | Tran | G01V 1/003 367/77 |
| 7,758,503 B2 | 7/2010 | Lynn | |
| 8,798,840 B2* | 8/2014 | Fong | G05D 1/0274 700/258 |

(Continued)

FOREIGN PATENT DOCUMENTS

KR   2001-0031345 A   4/2001

OTHER PUBLICATIONS

Communication dated Apr. 15, 2015 issued by the Korean Intellectual Property Office in counterpart Korean Patent Application No. 10-2013-0062415.

*Primary Examiner* — Hung Le
(74) *Attorney, Agent, or Firm* — Sughrue Mion, PLLC (57) ABSTRACT

The present invention relates to a heterogeneous data cluster generation apparatus and method and a data clustering method and apparatus, and more particularly, to a data clustering method and apparatus which cluster data measured by different sensors into a number of groups. Aspects of the present invention provide an apparatus and method for generating clusters by putting together heterogeneous data which are values measured by different types of sensors. Aspects of the present invention also provide an apparatus and method for generating clusters by setting indices in order to effectively cluster multi-dimensional data, massive data, or scattered data.

6 Claims, 7 Drawing Sheets

(56) References Cited

U.S. PATENT DOCUMENTS

| | | | |
|---|---|---|---|
| 2002/0099702 A1 | 7/2002 | Oddo | |
| 2010/0026686 A1* | 2/2010 | Koo | H04L 41/12 |
| | | | 345/440 |
| 2012/0057852 A1 | 3/2012 | Devleeschouwer | |
| 2012/0296906 A1* | 11/2012 | Tsai | G06F 17/30598 |
| | | | 707/737 |
| 2013/0060110 A1 | 3/2013 | Lynn | |
| 2013/0321411 A1* | 12/2013 | Pahwa | G06T 15/005 |
| | | | 345/420 |
| 2013/0325428 A1* | 12/2013 | Mande | G06F 19/22 |
| | | | 703/11 |
| 2013/0326494 A1* | 12/2013 | Nunez | H04L 41/082 |
| | | | 717/172 |
| 2014/0043470 A1* | 2/2014 | Winterot | G02B 9/34 |
| | | | 348/135 |

\* cited by examiner

CLUSTER GENERATION UNIT (140)

DATA ANALYSIS APPARATUS AND METHOD

This application is a divisional application of U.S. patent application Ser. No. 14/291,855, filed on May 30, 2014, which claims the benefit from Korean Patent Application No. 10-2013-0062415 filed on May 31, 2013 in the Korean Intellectual Property Office, the disclosures of which are incorporated herein by reference in their entirety.

BACKGROUND OF THE INVENTION

1. Field of the Invention

The present invention relates to a heterogeneous data cluster generation apparatus and method and a data clustering method and apparatus, and more particularly, to a data clustering method and apparatus which cluster data measured by different sensors into a number of groups.

2. Description of the Related Art

A cluster is a group in which similar data among numerous data are gathered together, and clustering is to classify numerous data into a number of groups according to similarity.

In conventional cluster-based clustering methods such as K-means, K-medoids and canopy, when new data is input, distances between the new data and all clusters are calculated to find a cluster closest to the input data. Then, the new data is included in the found cluster. In the conventional clustering methods, however, the amount of calculation required significantly increases when the number of clusters increases as the size of data increases. If the number of clusters is reduced to overcome this problem, the data lose their original characteristic information, making it difficult to accurately identify the data.

Of the conventional clustering methods, a clustering method using a hierarchical algorithm such as K-D Tree does not require distance calculation for all clusters. However, if the number N of dimensions becomes greater than 10, the number of nodes to be searched in a space increases geometrically, thus slowing down calculation. In addition, since the hierarchical algorithm such as K-D Tree is not balanced, nodes should be rearranged periodically in order to strike a balance between the nodes.

Also, scattered data cannot be effectively clustered using the conventional clustering method. If the scattered data are clustered using the conventional clustering method, different clustering results may be produced every time. Therefore, if the scattered data are clustered using the conventional clustering method, re-clustering may be frequently performed during clustering, which, in turn, increases the amount of calculation required.

To reduce the amount of calculation, a technology of reducing the dimension of data may be used. In this case, however, the data may lose information, and outlier data of the reduced dimension cannot be identified. Thus, accurate clustering is difficult.

Furthermore, systems, such as a building energy management system (BEMS), which measure various data using numerous different types of sensors are increasing. However, a technology of generating clusters by putting together various data measured by numerous different types of sensors is not available, and a technology of rapidly and effectively clustering various data continuously measured by numerous different types of sensors is also not available. The absence of such technologies is because data measured by numerous different types of sensors in, e.g., the BEMS are massive and scattered data, and thus it is difficult to cluster the data rapidly and accurately. Accordingly, this has led to a demand for a technology of generating clusters by putting various heterogeneous data together and a technology of effectively clustering various newly input data.

SUMMARY OF THE INVENTION

Aspects of the present invention provide an apparatus and method for generating clusters by putting together heterogeneous data which are values measured by different types of sensors.

Aspects of the present invention also provide an apparatus and method for generating clusters by setting indices in order to effectively cluster multi-dimensional data, massive data, or scattered data.

Aspects of the present invention also provide an apparatus and method for rapidly and efficiently clustering newly input data by reducing the amount of calculation compared with a conventional clustering method by identifying a location of the newly input data using an index.

Aspects of the present invention also provide an apparatus and method more efficiently employed to cluster massive data.

Aspects of the present invention also provide an apparatus and method for effectively clustering scattered data, which cannot be effectively clustered using a conventional clustering method, by identifying a location of newly input data using an index.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a heterogeneous cluster generation apparatus including: a reception unit receiving first time series data measured by a first sensor and second time series data measured by a second sensor which is a different type of sensor from the first sensor; a data merging unit generating an ordered pair set using the first time series data and the second time series data; and a cluster generation unit generating a cluster using the ordered pair set which corresponds to a location in a coordinate system composed of a first axis indicating measured values of the first time series data and a second axis indicating measured values of the second time series data, wherein the ordered pair set includes one or more ordered pairs, each composed of a measured value of the first time series data which corresponds to a specific time and a measured value of the second time series data which corresponds to the specific time.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

A building energy management system (BEMS) is designed to manage the energy of a building. To manage the energy of a building, the BEMS collects various information from numerous different sensors such as a temperature measurement sensor, a humidity measurement sensor, a $CO_2$ concentration measurement sensor, a gas consumption measurement sensor, and a power consumption measurement sensor.

Therefore, measured values that the BEMS receives from sensors include numerous heterogeneous measured values. In addition, values measured even by the same type of sensors may exist over a wide spectrum depending on various measurement environments such as whether a sensor is installed outside or inside a building, whether the sensor operates at night or during the daytime, and whether the sensor is installed on the first floor or the twentieth floor of the building.

Recently, there has been, and continues to be, an increase in the diversity of a system for collecting large and various data using numerous heterogeneous sensors. That is, smart grid-related systems such as a facility management system (FMS) and a building automation system (BAS) have been introduced in addition to the BEMS.

A heterogeneous data cluster generation apparatus according to an embodiment of the present invention may generate clusters by putting together large and various data measured by numerous heterogeneous sensors. In addition, the heterogeneous data cluster generation apparatus according to the embodiment of the present invention can be used to effectively cluster multi-dimensional data, massive data, and scattered data.

The heterogeneous data cluster generation apparatus according to the embodiment of the present invention will now be described in detail with reference to FIGS. 1 through 7.

Figure 1:
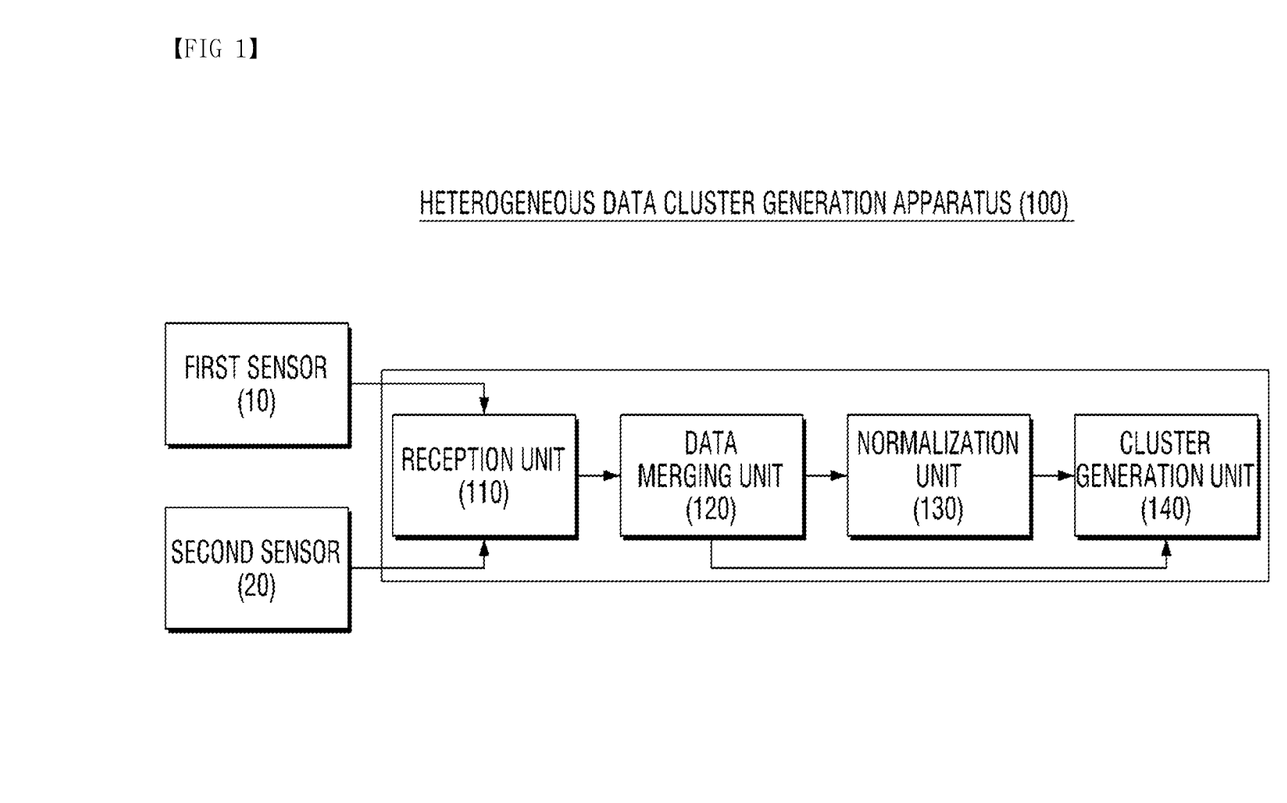
FIG. 1 is a block diagram of a heterogeneous data cluster generation apparatus according to an embodiment of the present invention.

FIG. 1 is a block diagram of a heterogeneous data cluster generation apparatus 100 according to an embodiment of the present invention.

Referring to FIG. 1, the heterogeneous data cluster generation apparatus 100 according to the current embodiment may include a reception unit 110, a data merging unit 120, a normalization unit 130, and a cluster generation unit 140.

The reception unit 110 receives time series data from each of a first sensor 10 and a second sensor 20 which are heterogeneous sensors. Specifically, the reception unit 110 receives from the first sensor 10 and the second sensor 20 data about values measured in a time series manner by the first sensor 10 and the second sensor 20 (for measuring heterogeneous information), together with information about times when the values were measured.

That is, the reception unit 110 may receive first time series data measured by the first sensor 10 and second time series data measured by the second sensor 20.

The term "time series data", as used herein, denotes data measured periodically or non-periodically over time.

Although two different sensors are described as an example to help understand the present invention, more than thousands of sensors (a third sensor, a fourth sensor, etc.) can be used.

The first sensor 10 and the second sensor 20 may measure different types of information. The first sensor 10 and the second sensor 20 may be, for example, a temperature measurement sensor and a power consumption measurement sensor, respectively.

If there are three or more sensors, at least one of the sensors should be a sensor that measures a different type of information from the other sensors. However, the other sensors can be sensors that measure the same type of information. Although the other sensors are sensors that measure the same type of information, they may produce significantly different measured values depending on their measurement environments. For example, both the second sensor 20 and a third sensor may be located on the first floor of a building, or the second sensor 20 may be located on the first floor while the third sensor is located on the rooftop.

That is, measured value data received by the reception unit 110 of the heterogeneous data cluster generation apparatus 100 according to the current embodiment are not all the same type of information but include heterogeneous information measured by heterogeneous sensors. Here, the heterogeneous information denotes measured values having different meanings or units.

The reception unit 110 is connected to each sensor in a wired or wireless manner so as to receive a measured value from each sensor in real time, periodically, or non-periodically.

The data merging unit 120 generates an ordered pair set using the first time series data and the second time series data received by the reception unit 110. The ordered pair set generated by the data merging unit 120 includes one or more ordered pairs, each composed of a measured value of the first time series data which corresponds to a specific time and a measured value of the second time series data which corresponds to the specific time.

The cluster generation unit 140 may generate a cluster using the ordered pair set which corresponds to a location in a coordinate system composed of a first axis and a second axis.

An ordered pair generated by the data merging unit 120 may be (a value of the first axis, a value of the second axis) corresponding to a specific time.

The first axis represents measured values of the first time series data, and the second axis represents measured values of the second time series data. Therefore, the number of axes may be set differently according to the number of sensors, the number of types of sensors, and the type of data measured by each sensor. For example, the reception unit 110 may receive measured value data from the first sensor 10 which measures temperature on the second floor of a building, the second sensor 20 which measures humidity on the second floor of the building, and the third sensor which measures water consumption on the second floor of the building. In this case, the number of axes may be determined to be three based on the three types of sensors that measure different information.

The coordinate system may be a plane or a space. That is, a coordinate system composed of two axes may be a plane, and a coordinate system composed of three axes may be a space.

The cluster generation unit 140 will be described in greater detail later after the data merging unit 120.

When the data merging unit 120 generates an ordered pair set, the difference in measurement time of each sensor can be a problem.

To generate an ordered pair set, the data merging unit 120 may use a measured value of the first time series data which corresponds to a specific time and a measured value of the second time series data which corresponds to the specific time. Here, the time corresponding to the specific time may be the same time as the specific time.

Alternatively, the time corresponding to the specific time may be within a preset time range $ThT_{ime}$ from the specific time. For example, if the specific time is 3.5 seconds and if the preset time range $ThT_{ime}$ is 0.5 seconds, the time corresponding to the specific time may be in a range of 3 to 4 seconds. That is, the value of the second axis set by the data merging unit 120 may be a value measured by the second sensor 20 between 3 and 4 seconds.

Alternatively, if measured value data received by the reception unit 110 does not include a value measured by the second sensor 20 at the same time as the specific time, a time closest to the specific time among measurement times of the second sensor 20 before and after the specific time may be set as the time corresponding to the specific time.

Alternatively, if the measured value data received by the reception unit 110 does not include a value measured by the second sensor 20 at the same time as the specific time, a time closest to the specific time among measurement times of the second sensor 20 before and after the specific time may be set as the time corresponding to the specific time.

The specific time may be the same as a measurement time of the first sensor 10 or a measurement time of the second sensor 20. Alternatively, the specific time may have a different interval from a measurement interval of the first sensor 10 and a measurement interval of the second sensor 20.

The time corresponding to the specific time may be set differently from the above description according to a user's intention or the degree of information collection by each sensor. However, the data merging unit 120 may construct an ordered pair set using time series data measured at similar times by the first sensor 10 and the second sensor 20.

Examples of generating ordered pairs using the data merging unit 120 will now be described in detail with reference to FIGS. 2 through 5.

FIGS. 2 through 5 are diagrams illustrating examples of generating ordered pairs using the data merging unit 120.

Figure 2:
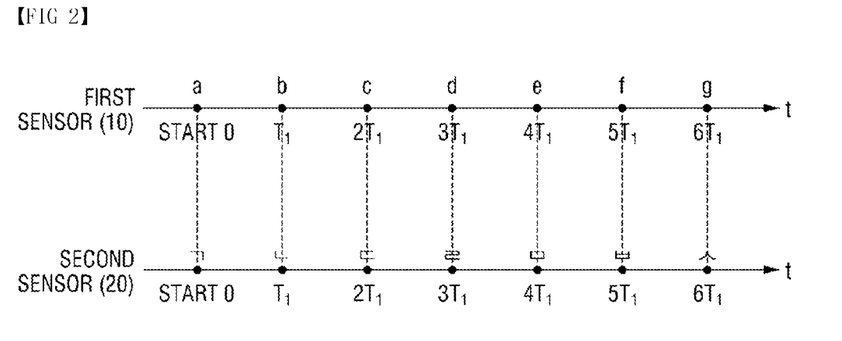
FIGS. 2 through 5 are diagrams illustrating examples of generating ordered pairs using a data merging unit.

Referring to FIG. 2, the first sensor 10 measures information at intervals of $T_1$, and the second sensor 20 also measures information at intervals of $T_1$. Assuming that the first sensor 10 and the second sensor 20 start to measure information from 0 seconds and that $T_1$ is 2 seconds, time series data of the first sensor 10 received by the reception unit 110 and represented in the form of (a measured value, a measurement time) may be (a,0), (b,2), (c,4), (d,6), (e,8), (f,10), and (g,12). Likewise, time series data of the second sensor 20 received by the reception unit 110 and represented in the form of (a measured value, a measurement time) may be (ㄱ,0), (ㄴ,2), (ㄷ,4), (ㄹ,6), (ㅁ,8), (ㅂ,10), and (ㅅ,12).

The data merging unit 120 may set a value 'a' measured by the first sensor 10 at a specific time of 0 seconds as the value of the first axis and a value 'ㄱ' measured by the second sensor 20 at the same time (0 seconds) as the specific time of 0 seconds as the value of the second axis. In addition, the data merging unit 120 may set a value 'b' measured by the first sensor 10 at another specific time of 2 seconds as the value of the first axis and a value 'ㄴ' measured by the second sensor 20 at the same time (2 seconds) as the another specific time as the value of the second axis. By applying this setting process to data of up to 12 seconds received by the reception unit 110, the data merging unit 120 may generate an ordered pair set of (a,ㄱ), (b,ㄴ), (c,ㄷ), (d,ㄹ), (e,ㅁ), (f,ㅂ), and (g,ㅅ). Specifically, (a,ㄱ) is an ordered pair generated by the data merging unit 120 using 'a' as the value of the first axis and 'ㄱ' as the value of the second axis at a specific time of 0 seconds. In addition, (b,ㄴ) is an ordered pair generated by the data merging unit 120 using 'b' as the value of the first axis and 'ㄴ' as the value of the second axis at another specific time of 2 seconds. In addition, (c,ㄷ) is an ordered pair generated by the data merging unit 120 using 'c' as the value of the first axis and 'ㄷ' as the value of the second axis at another specific time of 4 seconds. For each specific time when a measured value of the first sensor 10 exists, a value measured by the second sensor 20 at a time corresponding to the specific time may be generated as the value of the second axis. However, the specific time is not necessarily a time when the measured value of the first sensor 10 exists. Each time arriving at specific intervals $T_0$ may also be set as the specific time. This will be described later using an example with reference to FIG. 4.

An example of generating an ordered pair set using the data merging unit 120 in a case where the measurement interval of the first sensor 10 and the measurement interval of the second sensor 20 are different will now be described with reference to FIG. 3.

Figure 3:
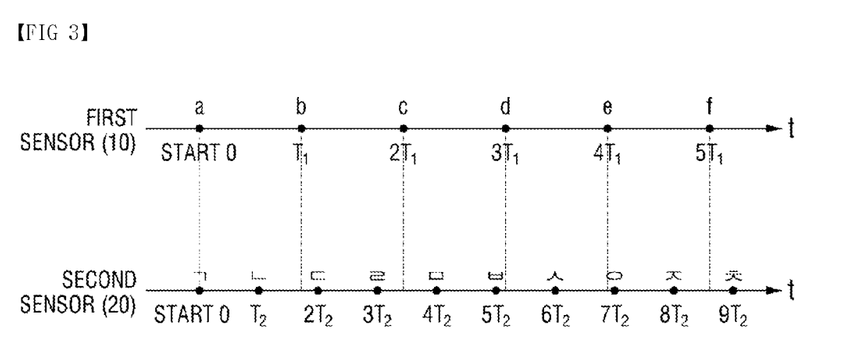

In FIG. 3, a measurement interval $T_1$ of the first sensor 10 is longer than a measurement interval $T_2$ of the second sensor 20. That is, in FIG. 3, not all values measured by the first sensor 10 and the second sensor 20 are values measured at the same time. Thus, the data merging unit 120 may generate an ordered pair by setting a time closest to a specific time among measurement times of the second sensor 20 before the specific time as a time corresponding to the specific time.

For example, assuming that the measurement interval $T_1$ of the first sensor 10 is 2 seconds in FIG. 3, the time series data of the first sensor 10 may be (a,0), (b,2), (c,4), (d,6), (e,8), and (f,10). In addition, assuming that the measurement interval $T_2$ of the second sensor 20 is 1.2 seconds, the time series data of the second sensor 20 may be (ㄱ,0), (ㄴ,1.2), (ㄷ,2.4), (ㄹ,3.6), (ㅁ,4.8), (ㅂ,6), (ㅅ,7.2), (ㅇ,8.4), (ㅈ,9.6), and (ㅊ,10.8).

In the case of FIG. 3, the data merging unit 120 may generate (a,ㄱ), (b,ㄴ), (c,ㄹ), (d,ㅂ), (e,ㅅ), and (f,ㅈ) as an ordered pair set.

Even when the measurement interval of the first sensor 10 is shorter than that of the second sensor 20, the data merging unit 120 may generate an ordered pair set as described above with reference to FIG. 3.

Specifically, in FIG. 3, the data merging unit 120 may generate an ordered pair set by setting a value measured by the second sensor 20 as the value of the first axis and setting a value measured by the first sensor 10 as the value of the second axis. In this case, the ordered pair set generated by the data merging unit 120 may be (ㄱ,a), (ㄴ,a), (ㄷ,b), (ㄹ,b), (ㅁ,c), (ㅂ,d), (ㅅ,d), (ㅇ,e), (ㅈ,e), and (ㅊ,f).

The data merging unit 120 may also not generate an ordered pair set by setting a time when data measured by the first sensor 10 or the second sensor 20 exists as a specific time. That is, the data merging unit 120 may generate an ordered pair set at the specific intervals $T_0$. If the data merging unit 120 generates an ordered pair set by setting each time arriving at the specific intervals $T_0$ as the specific time, an ordered pair set may be generated using a time closest to the specific time arriving among measurement value of each sensor existing before the specific time of the specific intervals $T_0$.

That is, if the specific time is set to a time arriving at the specific intervals $T_0$, the data merging unit 120 may regard a value measured at a time closest to the specific time among values measured by the first sensor 10 at times before the specific time as a value measured by the first sensor 10 at the specific time and set the value measured at the time closest to the specific time as the value of the first axis. In addition, the data merging unit 120 may regard a time closest to the specific time among measurement times of the second sensor 20 before the specific time as a time corresponding to the specific time and set a value measured by the second sensor 20 at the time corresponding to the specific time as the value of the second axis.

Figure 4:
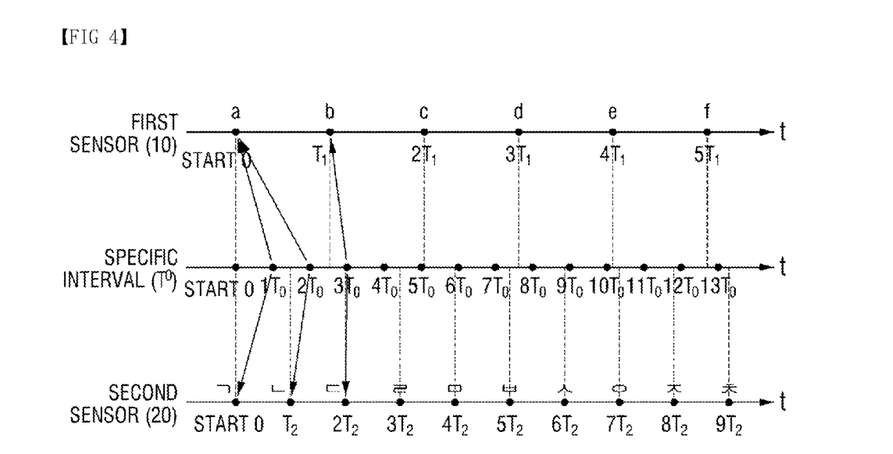

For example, in the case of FIG. 4, a measured value of the first sensor 10 and a measured value of the second sensor 20 received by the reception unit 110 may be as illustrated in FIG. 3, and the data merging unit 120 may set the specific interval $T_0$ to 0.8 seconds.

Referring to FIG. 4, at a first specific time of 0 seconds, the value of the first axis is 'a,' and the value of the second axis is 'ㄱ'. At a second specific time of 0.5 seconds after the specific interval $T_0$, the value of the first axis is 'a,' and the value of the second axis is 'ㄱ.' At a third specific time of 1 second after the specific interval $T_0$, the value of the first axis is 'a,' and the value of the second axis is 'ㄱ.' At a fourth specific time of 1.5 seconds after the specific interval $T_0$, the value of the first axis is 'a,' and the value of the second axis is 'ㄴ' measured at a time of 1.2 seconds. An ordered pair set generated by the data merging unit 120 in this way in FIG. 4 may be (a,ㄱ), (a,ㄱ), (a,ㄴ), (b,ㄷ), (b,ㄷ), (c,ㄹ), (c,ㅁ), (c,ㅁ), (d,ㅂ), (d,ㅅ), (e,ㅅ), (e,ㅇ), (e,ㅈ), (f,ㅈ), and (f,ㅊ).

As described above using examples with reference to FIGS. 3 and 4, when measured value data received by the reception unit 110 does not include a value measured by the second sensor 20 at the same time as a specific time, the data merging unit 120 may set a time closest to the specific time among measurement times of the second sensor 20 before the specific time as a time corresponding to the specific time.

As described above, when the measured value data received by the reception unit 110 does not include a value measured by the second sensor 20 at the same time as the specific time, the data merging unit 120 may also set a time closest to the specific time among measurement times of the second sensor 20 before and after the specific time as the time corresponding to the specific time. A case where the data merging unit 120 generates an ordered pair set in view of values existing not only before but also after the specific time will now be described using an example with reference to FIG. 5.

Figure 5:
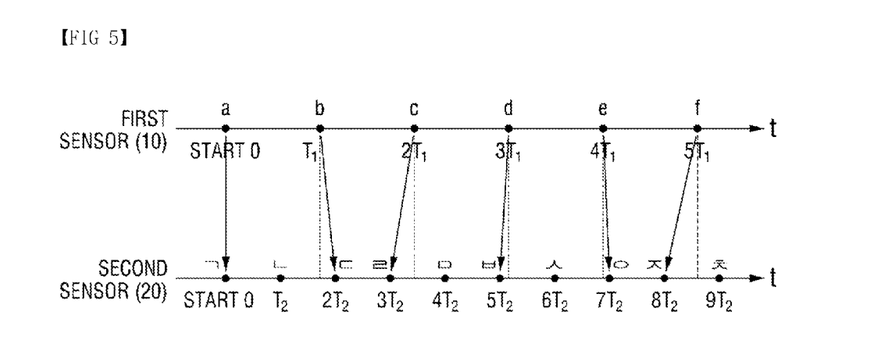

Referring to FIG. 5, a measured value of the first sensor 10, a measured value of the second sensor 20, $T_1$ and $T_2$ received by the reception unit 110 are as illustrated in FIG. 3.

In FIG. 5, since $T_1$ is 2 seconds and $T_2$ is 1.2 seconds, 2.4 seconds is closer to a specific time of 2 seconds among 1.2 and 2.4 seconds when the second sensor 20 measured values. Therefore, the data merging unit 120 may set a value 'b' measured by the first sensor 10 at the specific time of 2 seconds as the value of the first axis and a value 'ㄷ' measured by the second sensor 20 at a time of 2.4 seconds corresponding to the specific time of 2 seconds as the value of the second axis. An ordered pair set generated by the data merging unit 120 in this way in FIG. 5 may be (a,ㄱ), (b,ㄷ), (c,ㄹ), (d,ㅂ), (e,ㅇ), and (f,ㅈ).

To generate an ordered pair set in the same way as the data merging unit 120 did in FIG. 5, the reception unit 110 may receive measured value data of each sensor and generate an ordered pair set after a predetermined period of time in view of the measurement interval of each sensor.

In addition, the method of generating an ordered pair set using the data merging unit 120 in view of values existing not only before a specific time but also after the specific time can be applied to the method of generating an ordered pair set using the specific interval $T_0$ described above with reference to FIG. 4.

When the measurement start time of each sensor is different, the data merging unit 120 may also generate an ordered pair set using the method described above with reference to FIGS. 3 through 5 for a case where the measurement interval of the first sensor 10 and the measurement interval of the second sensor 20 are different.

When time series data of a third sensor exists, the data merging unit 120 may set the time series data of the third sensor as a value of a third axis. When time series data of a fourth sensor exists, the data merging unit 120 may set the time series data of the fourth sensor as a value of a fourth axis. In this case, an ordered pair generated by the data merging unit 120 may be in the form of (the value of the first axis, the value of the second axis, the value of the third axis, the value of the fourth axis).

Figure 6:
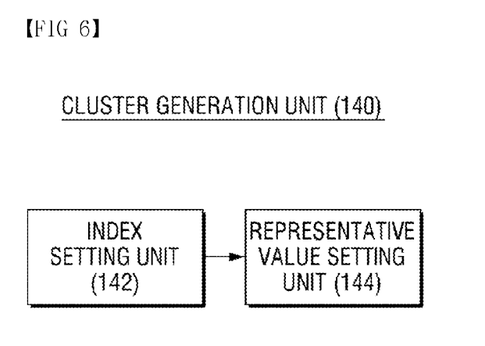
FIG. 6 is a block diagram of a cluster generation unit included in the heterogeneous data cluster generation apparatus of FIG. 1.

FIG. 6 is a block diagram of the cluster generation unit 140 included in the heterogeneous data cluster generation apparatus 100 of FIG. 1.

Referring to FIG. 6, the cluster generation unit 140 may include an index setting unit 142 and a representative value setting unit 144.

The index setting unit 142 may set a minimum value and a maximum value of the time series data of the first sensor 10 as a minimum value and a maximum value of the first axis and set a minimum value and a maximum value of the time series data of the second sensor 20 as a minimum value and a maximum value of the second axis.

In addition, the index setting unit 142 may generate a grid coordinate system by dividing a coordinate system (which is a plane when having two axes and is a space when having three axes) having a first axis and a second axis into a plurality of grid sections according to preset sensitivity and set a different index for each grid section. The coordinate system may be divided into the grid sections of equal sizes according to the preset sensitivity. When there are three or more axes, the index setting unit 142 may divide a space formed by the three or more axes into a plurality of grid spaces of equal sizes and set a different index for each grid space. In the present invention, since the coordinate system composed of the first axis and the second axis is described as an example, the term "grid section" is used. However, the present invention is not limited thereto. When there are three or more axes, grid spaces may be used without departing from the scope of the present invention.

The preset sensitivity may vary according to a user's setting, the system environment, the type of sensor, the amount of data, etc. The preset sensitivity is a parameter that can adjust the size of a cluster.

The data merging unit 120 may input a generated ordered pair set to a corresponding one of the grid sections generated by the index setting unit 142. The representative value setting unit 144 may generate clusters in grid sections having input data (ordered pairs) among the generated grid sections and set a representative value of each cluster.

When a plurality of data exist in one cluster, the representative value setting unit 144 may set the mean of the data as a representative value of the cluster or may set the representative value of the cluster using a preset method other than the mean.

Referring back to FIG. 1, the heterogeneous data cluster generation apparatus 100 according to the current embodiment may include the normalization unit 130.

The normalization unit 130 may perform normalization for each axis in order to generate clusters through reasonable intersection of axes.

If the normalization unit 130 does not perform normalization on each axis, the proportion of clusters generated by the cluster generation unit 140 may be greatly different for each axis due to the difference in the measured value of each sensor. Accordingly, ordered pair sets composed of measured values of the sensors may not be efficiently distributed. The normalization unit 130 may also increase easiness in comparing measured values in different the mean and unit.

The normalization unit 130 may calculate the mean and variance of the first time series data and the mean and variance of the second time series data, normalize the first time series data using the calculated mean and variance of the first time series data, and normalize the second time series data using the calculated mean and variance of the second time series data.

After the normalization by the normalization unit 130, the data merging unit 120 may generate an ordered pair set using the normalized first time series data and the normalized second time series data. Here, the generated ordered pair set may include one or more normalized ordered pairs, each composed of a value obtained by normalizing a measured value of the first time series data which corresponds to a specific time and a value obtained by normalizing a measured value of the second time series data which corresponds to the specific time. Alternatively, the normalization unit 130 may normalize an ordered pair set generated by the data merging unit 120 and generate the normalized ordered pair set.

After the normalization by the normalization unit 130, the index setting unit 142 may set a minimum value and a maximum value of the normalized first time series data as the minimum value and the maximum value of the first axis and set a minimum value and a maximum value of the normalized second time series data as the minimum value and the maximum value of the second axis. Then, the index setting unit 142 may divide a section composed of the first axis and the second axis into the grid sections according to the preset sensitivity and set a different index for each grid section.

After the normalization by the normalization unit 130, the cluster generation unit 140 may generate a cluster using the ordered pair set which corresponds to a location in the section composed of the first axis indicating measured values of the normalized first time series data and the second axis indicating measured values of the normalized second time series data.

Specifically, the normalization unit 130 may calculate the mean and variance using measured values of time series data and perform normalization using the calculated mean and variance. More specifically, the normalization unit 130 may perform normalization such as Z-score normalization by using the mean and variance calculated for each axis and a standard deviation calculated from the variance. A Z-score is one of standard scores and one of transformed scores obtained by dividing deviation scores from the mean by a standard deviation of the distribution of the deviation scores. Specifically, the Z-score may be calculated using Equation (1):

$$Z = (X - X')/S, \quad (1)$$

where Z is a transformed score obtained by Z-score normalization, X is a value of each axis, X' is the mean of values of each axis, and S is a standard deviation of the values of each axis.

Referring back to FIG. 6, if the normalization unit 130 performs normalization on each axis, the index setting unit 142 may set a minimum value and a maximum value among normalized values (values indicated by the normalized first time series data) of the first axis as the minimum value and the maximum value of the first axis and set a minimum value and a maximum value among normalized values (values indicated by the normalized second time series data) of the second axis as the minimum value and the maximum value of the second axis.

In addition, the index setting unit 142 may generate the grid sections by dividing the first axis and the second axis according to the preset sensitivity and set a different index for each grid section. To change the size of each cluster, the preset sensitivity may be changed.

The representative value setting unit 144 may generate a cluster in each grid section having ordered pairs. In addition, the representative value setting unit 144 may set a representative value of the generated cluster by using normalized ordered pairs existing in the generated cluster. A representative value of each cluster set by the representative value setting unit 144 may be the mean of ordered pairs existing in the cluster.

An example of clusters generated by the cluster generation unit 140 will now be described with reference to FIG. 7.

Figure 7:
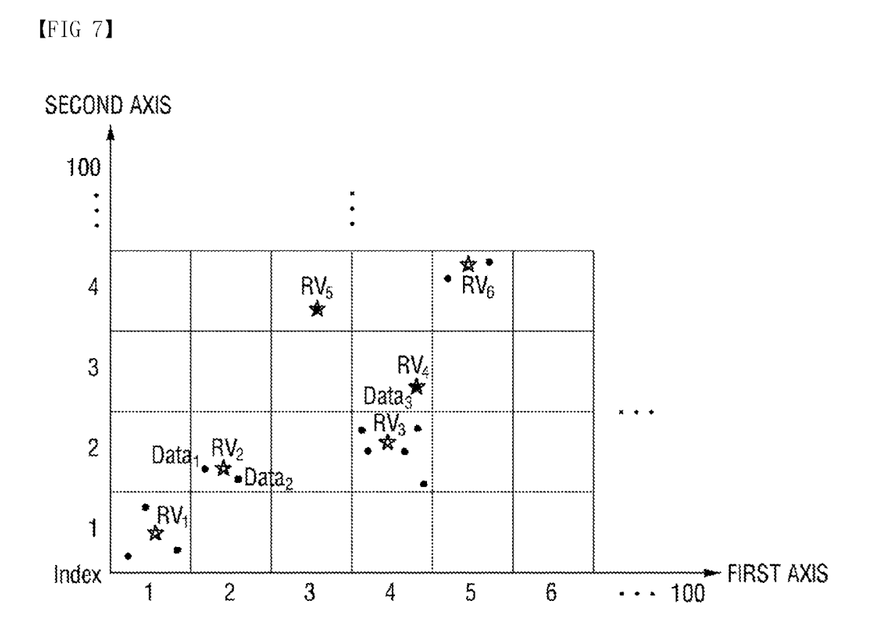
FIG. 7 is a diagram illustrating an example of clusters generated by the cluster generation unit included in the heterogeneous data cluster generation apparatus of FIG. 1.

In FIG. 7, the index setting unit 142 may generate 100×100 grid sections. Accordingly, 10,000 indices ranging from (1,1) to (100,100) may be set for the grid sections, respectively. A cluster having an index of (2,2) may include Data$_1$ and Data$_2$ as ordered pairs. Thus, the representative value setting unit 144 may set the mean of Data$_1$ and Data$_2$ as a representative value RV$_2$. A cluster having an index of (4,3) may include Data$_3$ as an ordered pair. Thus, the representative value setting unit 144 may set a value of Data$_3$ as a representative value. In FIG. 7, dots indicate ordered pair sets generated by the data merging unit 120 and input to corresponding grid sections. RV$_1$ through RV$_7$ indicate representative values of clusters, respectively, and numbers from 1 to 100 on each axis indicate index information.

The heterogeneous data cluster generation apparatus 100 according to the present invention may generate clusters by putting together heterogeneous data measured by different sensors.

In conventional clustering methods such as K-means, K-medoids, canopy and a hierarchical algorithm, when new data is input, distances between the new data and all clusters are calculated to find a cluster closest to the input data. Then, the new data is clustered in the found cluster. Therefore, in the conventional clustering methods, the amount of calculation required significantly increases if massive data exist in the clusters, and scattered data are not clustered efficiently. However, a data clustering apparatus according to an embodiment of the present invention can reduce the amount of calculation required for clustering and efficiently cluster scattered data by using clusters with set indices and arranged in a grid structure.

Figure 8:
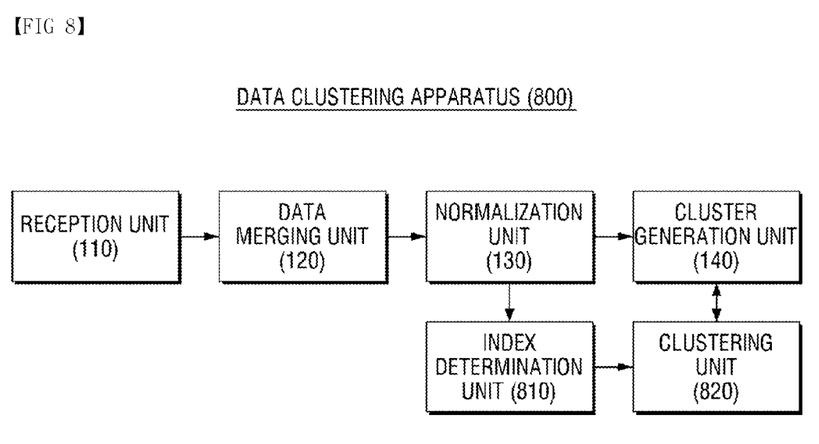
FIG. 8 is a block diagram of a data clustering apparatus according to an embodiment of the present invention.

FIG. 8 is a block diagram of a data clustering apparatus 800 according to an embodiment of the present invention.

The data clustering apparatus 800 according to the current embodiment will now be described with reference to FIG. 8. Referring to FIG. 8, the data clustering apparatus 800 according to the current embodiment includes a reception unit 110, a data merging unit 120, a normalization unit 130, a cluster generation unit 140, an index determination unit 810, and a clustering unit 820.

That is, when new data is input to a cluster generated by the heterogeneous data cluster generation apparatus 100 according to the embodiment of FIG. 1, the data clustering apparatus 800 according to the current embodiment clusters the new data. Therefore, the reception unit 110, the data merging unit 120, the normalization unit 130 and the cluster generation unit 140 described above with reference to FIGS. 1 through 7 will not be described in detail here, and only the index determination unit 810 and the clustering unit 820 will be described in detail.

When new data (a new ordered pair) is input to a generated cluster, the index determination unit 810 determines an index of a grid section to which the new data has been input. The new data may be data obtained by normalizing an ordered pair generated by the data merging unit 120 using the normalization unit 130.

Specifically, the data merging unit 120 may generate an ordered pair using a new measured value received by the reception unit 110 from each sensor, and the normalization unit 130 may normalize the generated ordered pair. The normalized ordered pair may be the new data The index determination unit 810 may determine an index of a grid section in which newly input data exists by using Equations (2) and (3):

$$z' = \frac{x' - E[X]}{\sigma[X]}, \quad (2).$$

In Equation (2), newly input data is normalized using Z-score normalization. In Equation (2), z' is a value obtained by normalizing new data, x' is newly input data, E[x] is the mean of ordered pairs stored in a cluster, and σ[x] is a standard deviation of the ordered pairs stored in the cluster. If z is an ordered pair composed of the value of the first axis and the value of the second axis, a normalized ordered pair z' is calculated by normalizing the value of the first axis and the value of the second axis using Equation (2). Calculating a normalized ordered pair of newly input data using Equation (2) may also be performed by the normalization unit 130.

An index of a grid section to which new data has been input may be determined using Equation (3) and the normalized ordered pair z' calculated using Equations (2):

$$\text{Index} = \text{ceiling}\left[\frac{(z' - \min[z])}{\max[z] - \min[z]} \times \frac{1}{grpNum}\right], \quad (3)$$

where Index is an index of normalized new data, z' is a normalized value of newly input data, min[z] is a minimum value among values of each axis stored in a cluster, max[z] is a maximum value among the values of each axis stored in the cluster, grpNum is the number of indices of each axis, and ceiling is a ceiling function.

The index determination unit 810 may determine index information of an ordered pair by applying Equation (3) to each normalized value of each axis that forms the normalized ordered pair z'.

When the index determination unit 810 determines an index of newly input ordered pair data, the clustering unit 820 determines a cluster of the newly input data using the determined index.

Specifically, when the index determination unit 810 determines an index, the clustering unit 820 may determine whether a cluster is available in a section indicated by the determined index and obtain representative value information of the cluster if the cluster is available.

When no cluster is available in the section indicated by the determined index, the clustering unit 820 may generate a new cluster by using ordered pair data newly input to the section indicated by the determined index as a representative value.

In addition, when a cluster is available in the section indicated by the determined index, the clustering unit 820 may include the newly input ordered pair data in the cluster and change a representative value of the cluster using the newly input ordered pair data.

The clustering unit 820 may also identify a representative value existing closest to a location to which the new ordered pair data has been input by calculating distances between representative values existing in sections, which correspond to indices, around the location of the newly input ordered pair data.

Figure 9:
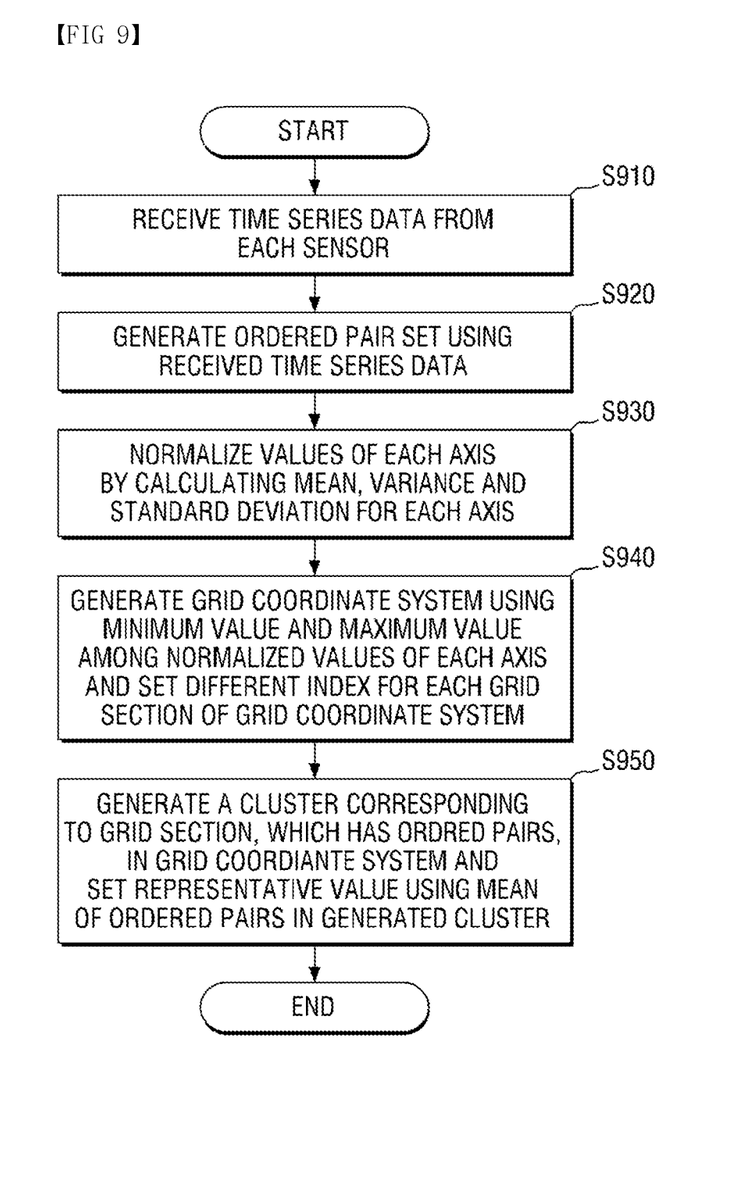
FIG. 9 is a flowchart illustrating a heterogeneous data cluster generation method according to an embodiment of the present invention.

FIG. 9 is a flowchart illustrating a heterogeneous data cluster generation method according to an embodiment of the present invention.

Referring to FIG. 9, in the heterogeneous data cluster generation method according to the current embodiment, the reception unit 110 may receive first time series data measured by a first sensor and second time series data measured by a second sensor which is a different type of sensor from the first sensor (operation S910).

The data merging unit 120 may generate an ordered pair set using the first time series data and the second time series data (operation S920). The ordered pair set generated by the data merging unit 120 may include one or more ordered pairs, each composed of a measured value of the first time series data which corresponds to a specific time and a measured value of the second time series data which corresponds to the specific time.

The normalization unit 130 may calculate the mean and variance of the first time series data and the mean and variance of the second time series data, normalize the first time series data using the calculated mean and variance of the first time series data, and normalize the second time series data using the calculated mean and variance of the second time series data (operation S930).

The ordered pair set generated by the data merging unit 120 may use the normalized first time series data and the normalized second time series data, and the normalization unit 130 may generate a normalized ordered pair set by normalizing the ordered pair set generated by the data merging unit 120.

The index setting unit 142 may set a minimum value and a maximum value of the normalized first time series data as a minimum value and a maximum value of a first axis and a minimum value and a maximum value of the normalized second time series data as a minimum value and a maximum value of a second axis, generate a grid coordinate system by dividing a coordinate system composed of the first axis and the second axis into a plurality of grid sections according to preset sensitivity, and set a different index for each grid section (operation S940).

The representative value setting unit 144 may generate a cluster using the normalized ordered pair set which corresponds to a location in the coordinate system composed of the first axis indicating measured values of the normalized first time series data and the second axis indicating measured values of the normalized second time series data and set a representative value of the generated cluster using normalized ordered pairs existing in the generated cluster (operation S950).

Figure 10:
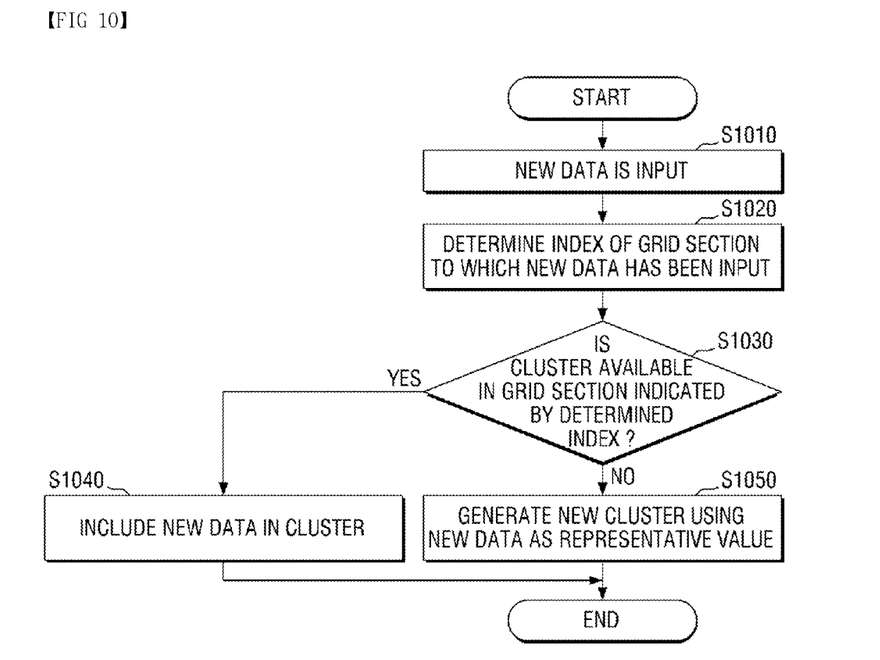
FIG. 10 is a flowchart illustrating a data clustering method according to an embodiment of the present invention.

FIG. 10 is a flowchart illustrating a data clustering method according to an embodiment of the present invention.

Referring to FIG. 10, in the data clustering method according to the current embodiment, when new data is input to any one of grid sections generated using the heterogeneous data cluster generation method according to the embodiment of FIG. 9 (operation S1010), the index determination unit 810 may determine an index of the grid section to which the new data has been input (operation S1020). The grid sections may be sections into which a section composed of two axes, i.e., a first axis and a second axis is divided. However, the present invention is not limited thereto, and the grid sections may also be understood as sections into which a space formed by three or more axes is divided. The new data may be data generated as an ordered pair by the data merging unit 120 using a value received by the reception unit 100 from each sensor. The new data may also be an ordered pair normalized by the normalization unit 130.

When a cluster is available in the grid section indicated by the determined index, the clustering unit 820 may include the newly input ordered pair data in the cluster and change a representative value of the cluster using the newly input ordered pair data (operations S1020 and S1040).

When no cluster is available in the grid section indicated by the determined index, the clustering unit 820 may generate a new cluster by using the ordered pair data newly input to the grid section indicated by the determined index as a representative value (operations S1030 and S1050).

The clustering unit 820 may also identify a representative value existing closest to a location to which the new ordered pair data has been input by calculating distances between representative values existing in sections, which correspond to indices, around the location of the newly input ordered pair data.

Each component described above with reference to FIGS. 1, 6 and 8 may be implemented as a software component or a hardware component such as a Field Programmable Gate Array (FPGA) or Application Specific Integrated Circuit (ASIC). Each component is not limited to the software or hardware component and may advantageously be configured to reside on the addressable storage medium and configured to execute on one or more processors. The functionality provided for in the components may be further separated into additional components or combined into fewer components.

A heterogeneous data cluster generation apparatus and method according to the present invention can generate clusters by putting together heterogeneous data measured by different sensors.

The heterogeneous data cluster generation apparatus and method according to the present invention can also generate clusters used to effectively cluster multi-dimensional data, massive data, or scattered data.

A data clustering method and apparatus according to the present invention can reduce the amount of calculation required for clustering, compared with a conventional clustering method.

The data clustering method and apparatus according to the present invention can also cluster massive data rapidly and accurately, compared with the conventional clustering method.

The data clustering method and apparatus according to the present invention can rapidly and accurately cluster scattered data which cannot be easily clustered using the conventional clustering method.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A data analysis apparatus comprising:
an index setting unit configured to set a different index for each of a plurality of grid sections of a grid coordinate system;

a cluster generation unit configured to generate a cluster in a region of the grid coordinate system, the region having data values, and to set a representative value of the cluster using the data values existing in the generated cluster;

an index determination unit configured to respond to new data input to any one of the grid sections by determining an index of the grid section to which the new data has been input; and a clustering unit configured to cluster the new data using the determined index and the set representative value, wherein the set representative value is further set using normalized ordered pairs existing in the generated cluster, and wherein at least one of the index setting unit, the cluster generation unit, the index determination unit, and the clustering unit is implemented by one or more hardware processors.

2. The apparatus of claim 1, wherein the clustering unit is further configured to include the new data in a cluster, in the grid section corresponding to the determined index, when the determined index indicates that the cluster in the grid section corresponding to the determined index is available.

3. The apparatus of claim 1, wherein the clustering unit is further configured to generate a cluster in the grid section corresponding to the determined index, for the new data, when the determined index information indicates that no cluster is available in the grid section corresponding to the determined index.

4. A data analysis method comprising:

setting a different index for each of a plurality of grid sections of a grid coordinate system;

generating a cluster in a region of the grid coordinate system, the region having data values;

setting a representative value of the cluster using the data values existing in the generated cluster;

responding to new data input to any one of the grid sections by determining an index of the grid section to which the new data has been input; and clustering the new data using the determined index and the set representative value, wherein the representative value is further set using normalized ordered pairs existing in the generated cluster.

5. The method of claim 4, further comprising including the new data in a cluster, in the grid section corresponding to the determined index when the determined index indicates that the cluster in the grid section corresponding to the determined index is available.

6. The method of claim 4, further comprising generating a cluster in the grid section corresponding to the determined index, for the new data, when the determined index information indicates that no cluster is available in the grid section corresponding to the determined index.

* * * * *